United States Patent
Kawano et al.

(12)

(10) Patent No.: US 6,337,726 B1
(45) Date of Patent: Jan. 8, 2002

(54) ARRAY SUBSTRATE FOR LIQUID CRYSTAL DISPLAY ELEMENT

(75) Inventors: Hideo Kawano, Kobe; Takaaki Kamimura, Himeji, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/255,714

(22) Filed: Feb. 23, 1999

(30) Foreign Application Priority Data

| Feb. 24, 1998 | (JP) | 10-042053 |
| Mar. 25, 1998 | (JP) | 10-077223 |
| Mar. 25, 1998 | (JP) | 10-077224 |
| Feb. 9, 1999 | (JP) | 11-031054 |

(51) Int. Cl.$^7$ .............................. G02F 1/1343
(52) U.S. Cl. ...................... 349/141; 349/143
(58) Field of Search ................... 349/141, 143

(56) References Cited

U.S. PATENT DOCUMENTS

| 5,420,708 A | * | 5/1995 | Yokoyama et al. ........... 359/67 |
| 5,995,187 A | * | 11/1999 | Wakagi et al. ............... 349/141 |
| 6,137,560 A | * | 10/2000 | Utsumi et al. ............... 349/141 |

FOREIGN PATENT DOCUMENTS

| JP | 6-160878 | 6/1994 |
| JP | 7-128647 | 5/1995 |
| JP | 7-128683 | 5/1995 |
| JP | 9-61845 | 3/1997 |
| JP | 9-258242 | 10/1997 |
| JP | 9-325346 | 12/1997 |
| JP | 10-10556 | 1/1998 |
| JP | 10-48670 | 2/1998 |

* cited by examiner

*Primary Examiner*—William L. Sikes
*Assistant Examiner*—Dung Nguyen
(74) *Attorney, Agent, or Firm*—Pillsbury Winthrop LLP

(57) ABSTRACT

A number of pixel regions surrounded by scanning signal lines and display signal lines are defined on an array substrate of a liquid crystal display element. Formed in each pixel region are a display pixel electrode extending in parallel with the display signal lines and two opposite electrodes provided on both sides of the display pixel electrode and extending in parallel with the display pixel electrode. Each of the two opposite electrodes is provided at a predetermined interval from the display pixel electrode. An end of the display pixel electrode is layered over an opposite signal line, thereby constituting a first supplemental capacity, and another end thereof is electrically connected to a switching element. An end of each opposite electrode is electrically connected to an opposite signal line. The display pixel electrode and the opposite electrodes are formed by processing the same conductive layer as that forming the display signal lines.

9 Claims, 9 Drawing Sheets

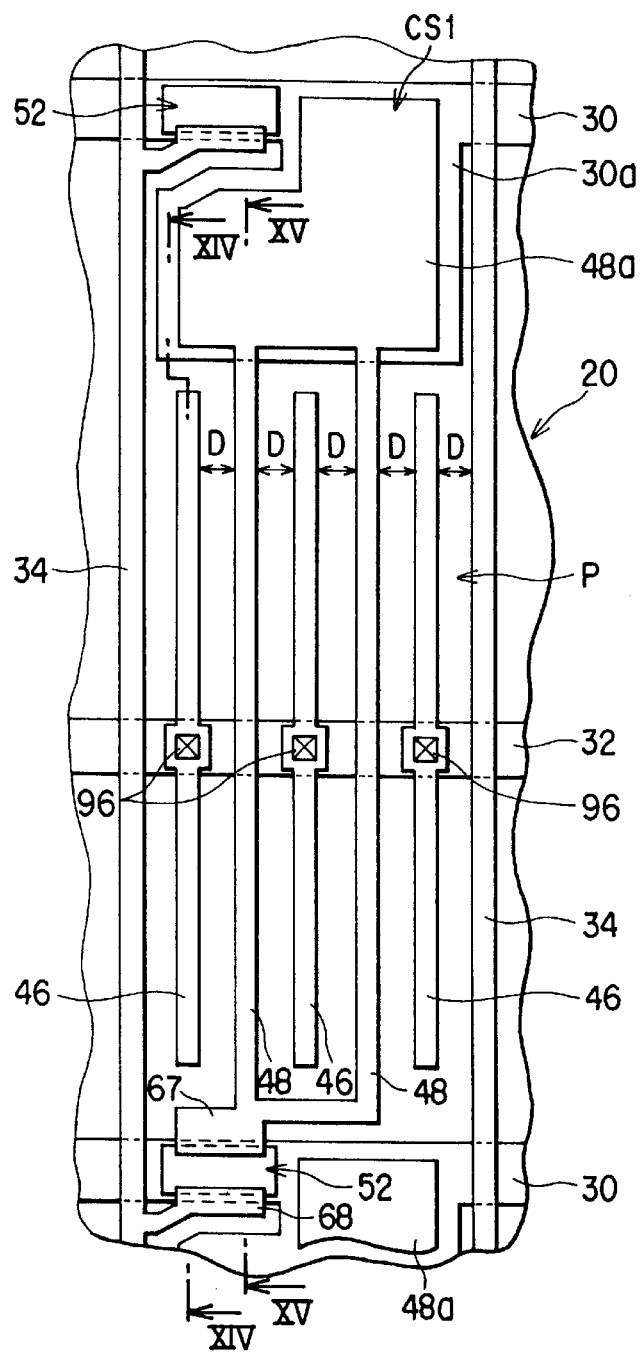
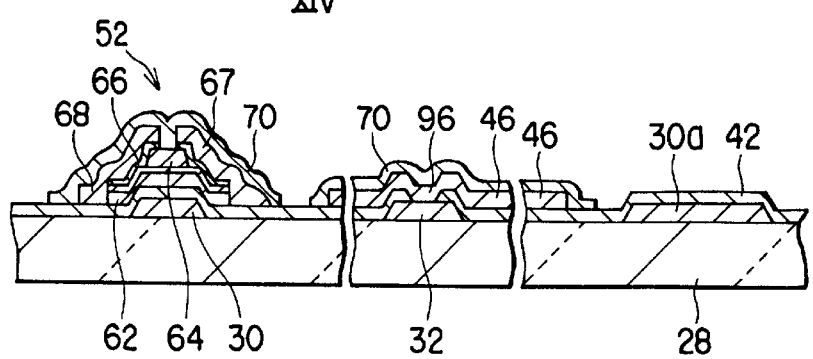
FIG. 13
FIG. 14

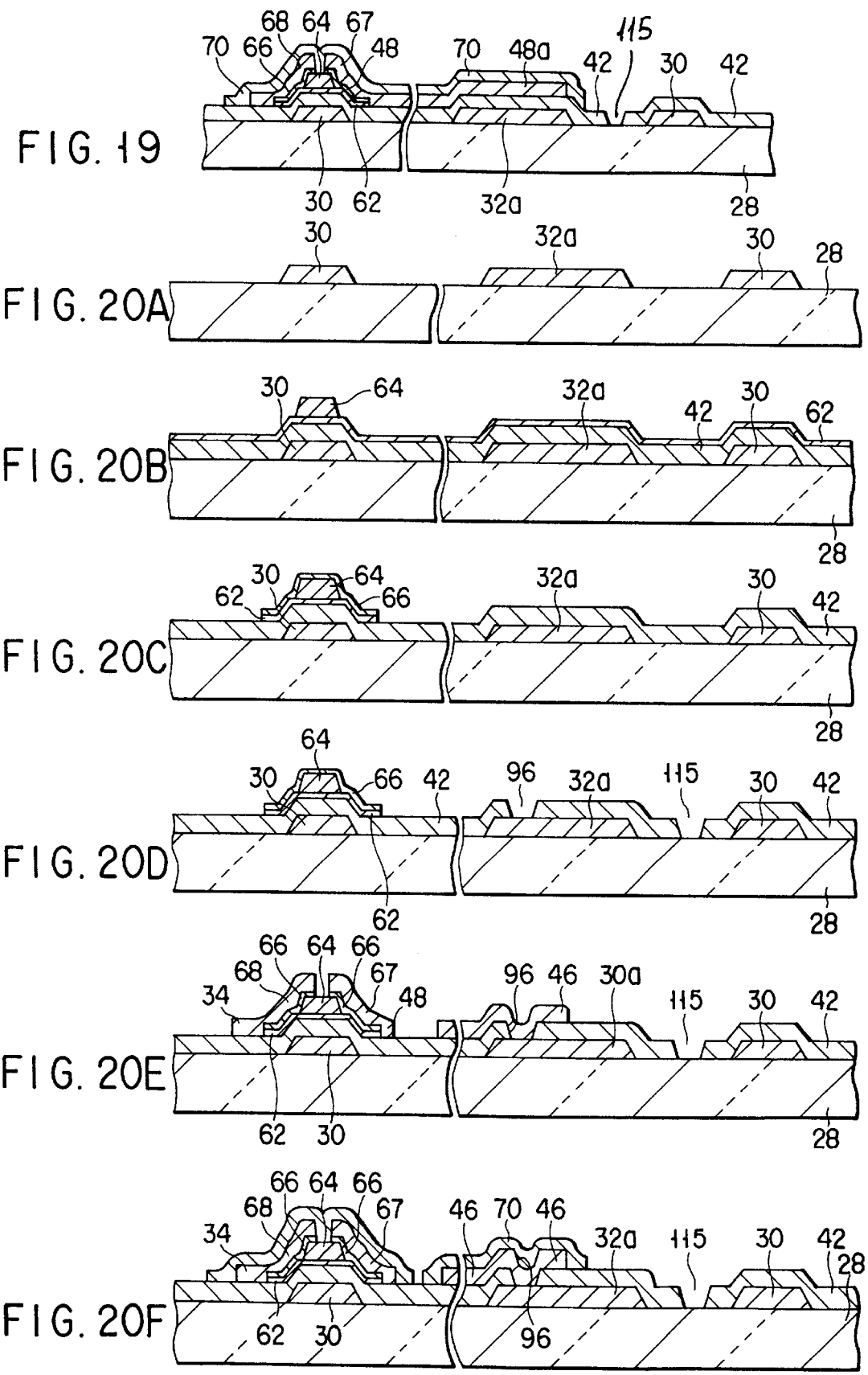

ARRAY SUBSTRATE FOR LIQUID CRYSTAL DISPLAY ELEMENT

BACKGROUND OF THE INVENTION

The present invention relates to an array substrate used for a liquid crystal display element, and particularly for a liquid crystal display element of in-plane switching type, a liquid crystal display element provided with the array substrate, and a method of manufacturing an array substrate.

In recent years, a display element having a large capacity and a high density which can be used for TV display and graphic display has been eagerly developed and practiced as a display element using liquid crystal. In particular, development and commercial production has been widely made of a liquid crystal display element of an active matrix type capable of displaying an image at a high contrast ratio without cross-talk.

Also, in recent years, a wider view angle has been required for a liquid crystal display element aimed for monitor use, and various techniques for wide view angle has been developed. Particular attention is being paid to a so-called IPS (In-Plane Switching) method in which display pixel electrodes and opposite electrodes are formed on one same substrate and liquid crystal is made respond by an electric field generated substantially in parallel to the substrate.

As a liquid crystal display element of an active matrix type adopting the IPS method, there is proposed a display element in which the display pixel electrodes and opposite electrodes are respectively made of display signal line layers and scanning signal line layers, a supplemental capacity is formed on opposite signal lines, and a thin film transistor (hereinafter referred to as only TFT) of a stagger type is used as a switching element.

Specifically, according to this liquid crystal display element, a MoW film is formed at 200 angstrom on an insulating substrate, scanning signal lines including gate electrodes and opposite signal lines parallel thereto are processed by photoetching thereafter, and the opposite electrodes extending perpendicularly from the opposite signal lines are processed into a predetermined shape. Next, pattern inspection of scanning signal lines is carried out. Thereafter, an insulating film made of SiO with a thickness of 3000 angstrom and i-type amorphous silicon (hereinafter referred to as a-Si) film with a thickness of 500 angstrom serving as a semiconductor layer constituting channel regions for the TFTs are each formed on the entire surface of the substrate by a CVD (Chemical Vapor Deposition) method.

Subsequently, an etching protection film made of SiN for protecting channels of the TFTs is formed at 2000 angstrom also by the CVD method, and thereafter, only the protection film is processed into a predetermined shape by photoetching. Further, an n+ type a-Si film is formed at 500 angstrom by the CVD method, and then, the i-type a-Si film and the n+ type a-Si film are processed into a predetermined shape by photoetching. Subsequently, power supply electrodes for the scanning signal lines and opposite signal lines are processed into a predetermined shape by photoetching.

Next, a Al film is formed at 3000 angstrom by a sputtering, and thereafter, display signal lines, source and drain electrodes of the TFTs, display pixel electrodes, supplemental capacity electrodes, power supply lines of the opposite signal lines, and the n+ type a-Si film between the source and drain electrodes are processed into predetermined shapes. In this case, the display pixel electrodes are arranged in parallel with the opposite electrodes.

Then, a protection film made of SiN is formed at 2000 angstrom by the CVD method and are processed into predetermined shape. A substrate for a liquid crystal display element of an active matrix type (hereinafter referred to as an array substrate) is thus prepared. This array substrate and an opposite substrate made of an insulating substrate are adhered together on each other with a predetermined gap, and a liquid crystal layer is sealed between these substrates, thus completing a liquid crystal display element of an active matrix type.

In the above-mentioned liquid crystal display element of an active matrix type adopting the IPS method, each pixel is constituted by a plurality of apertures interposed between a plurality of substantially linear display pixel electrodes and a plurality of substantially linear opposite electrodes, which are formed of different layers on the same substrate, by means of independent photoetching steps. Therefore, there is a case that the distance between the display pixel electrodes and the opposite electrodes is not uniform in the pixels due to misalignment of patterns during exposure.

For example, if each pixel region includes two display pixel electrodes parallel to each other and one opposite electrode arranged in parallel between the display pixel electrodes, the distances between the opposite electrode and the display pixel electrodes do not become uniform due to misalignment during exposure. In this case, the electric field generated between both electrodes is strong at the portion where the distance between both electrodes is short than at the portion where the distance between both electrodes is wide. Consequently, the responsibility of liquid crystal differs between both portions so that the luminance does not become uniform in one same pixel. This ununiformity in the pixel deteriorates the display quality of the screen and is observed as roughness with eyes.

Meanwhile, in consideration of the responsibility of liquid crystal, the electric field generated between the display electrodes and the opposite electrode should desirably be perfectly parallel to the surface of the array substrate. In practice, however, the electric field becomes arc-shaped due to electrode end effects. Therefore, the effective horizontal electric field between the electrodes is weaker and the responsibility of liquid crystal is lowered than in the case where the electric field is perfectly parallel to the substrate.

Narrowing of the distance between both electrodes can be considered to be a method of compensating the weakening of the electric field. In this case, the numerical aperture is lowered so that the permeability is deteriorated. If the back-light is strengthened to compensate this deterioration, increase of the power consumption is caused undesirably.

Increase of the voltage applied to both electrodes can be considered as another method. This means increase of the drive voltage and leads to increase of the power consumption.

Also, this kind of liquid crystal display element comprises an opposite substrate opposed to the array substrate. A black matrix as a light shielding layer, a color filter, and the like are formed on the opposite substrate. In general, the black matrix is arranged such that the opening portions thereof are opposed to the pixel region of the array substrate, respectively, and the periphery of each opening is layered over the opposed electrode.

However, if the peripheral edges of the openings of the black matrix are positioned between the opposite electrodes and the pixel electrodes due to a relative positional offset between the array substrate and the opposite substrate during assembly, the aperture ratio of the liquid crystal display element is lowered so that the screen luminance is lowered. Inversely, if the peripheral edges of the openings of the black matrix are positioned between the opposite electrodes and the display signal lines, light leaks so that roughness appears on the screen and the contrast is lowered, resulting in deterioration of the image quality. As a method of preventing this positional offset of the black matrix, the width of the opposite electrodes may be thickened. In this case, however, the aperture ratio is lowered.

BRIEF SUMMARY OF THE INVENTION

The present invention has been contrived in consideration of the above circumstances and its object is to provide an array substrate for a liquid crystal element, which is capable of improving the image quality and the response of liquid crystal without increasing the power consumption, a liquid crystal display element comprising the array substrate, and a method of manufacturing the array substrate.

To achieve the above object, an array substrate for a liquid crystal display element according to the present invention comprises: a substrate; a plurality of scanning signal lines and opposite signal lines arranged on the substrate and extending in parallel with each other; a plurality of parallel display signal lines arranged on the scanning signal lines and the opposite signal lines, with an insulating film interposed therebetween, and extending in a direction crossing the scanning signal lines and opposite signal line; and a plurality of pixel regions defined by regions surrounded by the scanning signal lines and display signal lines, respectively.

Each of the pixel regions includes an elongated first electrode having an end which is layered over one of the opposite signal lines so as to constitute a supplemental capacity and another end electrically connected to a crossing portion between one of the scanning signal lines and one of the display signal lines, through a switching element, and a second electrode extending substantially in parallel with the first electrode and having an end electrically connected to the opposite signal line. The first and second electrodes are formed by processing one same conductive layer.

According to an array substrate for a liquid crystal display element according to the present invention, the first and second electrodes are formed by processing the same conductive layer as that constituting the display signal lines.

Moreover, according to an array substrate according to the present invention, the first and second electrodes are formed of a film having a thickness of 3000 angstrom or more or preferably a thickness of 5000 angstrom or more.

Further, according to an array substrate for a liquid crystal display element according to the present invention, each of the first and second electrodes have side surfaces inclined at 30° to 90° with respect to the surface of the insulating substrate.

Meanwhile, a liquid crystal display element according to the present invention comprises first and second substrates opposed to each other with a liquid crystal layer inserted therebetween, wherein the first substrate includes a plurality of scanning signal lines and opposite signal lines arranged on an insulating substrate and extending in parallel with each other, a plurality of parallel display signal lines arranged on the scanning signal lines and the opposite signal lines, with an insulating film inserted therebetween, and extending in a direction crossing the scanning signal lines and opposite signal lines, and a plurality of pixel regions defined by regions surrounded by the scanning signal lines and display signal lines, respectively.

Each of the pixel regions includes an elongated first electrode having an end which is layered over one of the opposite signal lines so as to constitute a supplemental capacity and another end electrically connected to a crossing portion between one of the scanning signal lines and one of the display signal lines, through a switching element, and a second electrode extending substantially in parallel with the first electrode and having an end electrically connected to the opposite signal line. The first and second electrodes are formed by processing one same conductive layer.

According to the array substrate for a liquid crystal display element and the liquid crystal display element comprising the substrate, the first electrodes which function as display pixel electrodes and the second electrodes which function as opposite electrodes are formed by photo-etching one same conductive layer in one same step. Therefore, the distance between both kinds of electrodes can be uniform over the entire surface of the substrate. Accordingly, the electric fields generated between both kinds of electrodes can be uniform so that the response of liquid crystal is uniform at any of the pixel regions over the display area. As a result, roughness of the screen is reduced and the image quality of the liquid crystal display element is improved.

In addition, if the first and second electrodes are thickened to 3000 angstrom or more while the distance between the opposite substrate and the first substrate having the first and second electrodes is maintained to be constant, the ratio of liquid crystal which responds to the electric fields generated between the side surfaces of both kinds of electrodes and in substantial parallel with the surface of the insulating substrate is increased. Further, since the direction of the electric field generated from the surface of conductive material is perpendicular to the surface of the conductive material, the electric fields between the side surfaces of both kinds of electrodes can be more parallel to the surface of the insulating substrate if the inclination angle of the side surfaces of the electrodes to the surface of the insulating substrate is enlarged. Particularly, in a case where the inclination angle is 90° to the surface of the insulating substrate, the electric fields generated between the side surfaces of the first and second electrodes are parallel to the surface of the insulating substrate and the intensity of the electric fields can be maximized if the distance between both electrodes or the drive voltage is constant. Accordingly, the response of liquid crystal can be improved without increasing the power consumption.

Meanwhile, an array substrate for a liquid crystal display element according to the present invention comprises: a plurality of scanning signal lines and opposite signal lines arranged on an insulating substrate and extending in parallel with each other, a plurality of parallel display signal lines arranged on the scanning signal lines and the opposite signal lines, with an insulating film inserted therebetween, and extending in a direction crossing the scanning signal lines and opposite signal lines, and a plurality of pixel regions defined by regions surrounded by the scanning signal lines and display signal lines, respectively.

In each of the pixel regions, there are provided an elongated first electrode electrically connected to a crossing portion between one of the scanning signal lines and one of the display signal lines, through a switching element, an elongated second electrode extending substantially in parallel with the first electrode and electrically connected to the opposite signal line, and an elongated light shielding layer positioned below the second electrode adjacent to the display signal line, with an insulating film interposed therebetween, and extending substantially in parallel with the second electrode to shield a gap between the display signal line and the second electrode. The first and second electrodes are formed by processing one same conductive layer.

Also, according to the present invention, the light shielding layer includes a side edge portion positioned to be layered over the second electrode with the insulating film interposed therebetween.

In addition, the display signal lines and the first and second electrodes are formed by processing one same conductive layer having a light shielding characteristic.

Further, the display signal lines and the first and second electrodes are provided on the insulating film, and the second electrode is electrically connected to the opposite signal line through a contact hole formed in the insulating film.

A liquid crystal display element according to the present invention comprises first and second substrates arranged to be opposed to each other with a liquid crystal layer interposed therebetween, wherein the first substrate includes a plurality of scanning signal lines and opposite signal lines arranged in parallel with one another on an insulating substrate, a plurality of display signal lines arranged in parallel with each other on the scanning signal lines and the opposite signal lines, with an insulating film interposed therebetween, such that the display signal lines cross the scanning signal lines and opposite signal lines, and a plurality of pixel regions defined by regions surrounded by the scanning signal lines and display signal lines, respectively.

In each of the pixel regions, there are provided an elongated first electrode electrically connected to a crossing portion between one of the scanning signal lines and one of the display signal lines, through a switching element, an elongated second electrode extending substantially in parallel with the first electrode and having an end electrically connected to the opposite signal line, and an elongated light shielding layer positioned below the second electrode adjacent to the display signal line, with the insulating film interposed therebetween, and extending substantially in parallel with the second electrode thereby to shield a gap between the display signal line and the second electrode. The first and second electrodes are formed by processing one same conductive layer.

According to the array substrate constructed as described above and the liquid crystal display element comprising the substrate, the first electrodes and the second electrodes are formed by photo-etching a common conductive layer in one same step. Therefore, the distance between both kinds of electrodes:can be uniform over the entire surface of the first substrate. Accordingly, the electric fields generated between both kinds of electrodes can be uniform over the entire surface of the first substrate, so that the response of liquid crystal are uniform at any of the opening portions respectively constituting pixels, over the entire surface of the display area. As a result, the roughness of the screen is reduced and the display quality of the liquid crystal display apparatus is improved.

Also, an elongated light shielding layer is provided as a lower layer below the second electrode adjacent to the display signal line and extends substantially in parallel with the second electrode. The shielding layer shields the gap between the display signal line and the second electrode. Therefore, while electrically insulating the first and second electrodes, the width of the light shielding region can be enlarged without lowering the aperture ratio of the pixel region. Accordingly, even if a positional offset appears more or less between the array substrate and the second substrate during assembly of the liquid crystal display element, the side edges of the opening of the light shielding layer on the second substrate side can be securely positioned to oppose the light shielding region of the array substrate. As a result of this, neither the aperture ratio nor the luminance of the liquid crystal display element is lowered. The power consumption of the back light is not required to compensate for such lowering of the aperture ratio or luminance, and leakage of light caused by a positional offset can be prevented. In this manner, it is possible to provide a liquid crystal display element with excellent display quality.

Further, an array substrate according to the present invention comprises: a substrate; a plurality of scanning signal lines arranged on the substrate and extending in parallel with each other; a plurality of opposite signal lines arranged on the substrate to extend in parallel with the scanning signal lines, each of the opposite signal lines being located substantially at a center between two adjacent scanning signal lines; a plurality of display signal lines arranged in parallel with each other on the scanning signal lines and the opposite signal lines, with an insulating film interposed therebetween, on the substrate, such that the display signal lines cross the scanning signal lines and opposite signal line; and a plurality of pixel regions defined by regions surrounded by the scanning signal lines and the display signal lines, respectively.

Each of the pixel regions includes a first electrode electrically connected to a crossing portion between one of the scanning signal lines and one of the display signal lines, through a switching element, and a second electrode which is formed of one same conductive layer as that constituting the first electrode and arranged in parallel with the first electrode with a predetermined interval therebetween, the second electrode being electrically connected to the opposite signal line.

Also, an array substrate for a liquid crystal display element according to the present invention comprises: a substrate; a plurality of scanning signal lines arranged in parallel with each other on the substrate; a plurality of opposite signal lines provided on the substrate to extend in parallel with the scanning signal lines and respectively arranged apart from the scanning signal lines by a predetermined distance; a plurality of display signal lines arranged in parallel with each other on the scanning signal lines and the opposite signal lines, with an insulating film interposed therebetween, on the substrate, such that the display signal lines cross the scanning signal lines and opposite signal line; and a plurality of pixel regions defined by regions surrounded by the scanning signal lines and the display signal lines, respectively.

Each of the pixel regions includes a first electrode electrically connected to a crossing portion between one of the scanning signal lines and one of the display signal lines, through a switching element, a second electrode which is formed of one same conductive layer as that constituting the first electrode, arranged in parallel with the first electrode with a predetermined interval therebetween, and electrically connected to the opposite signal line, and an opening portion formed in the insulating film between the opposite signal line and one of the scanning signal lines adjacent to the opposite signal line and extending to a surface of the substrate.

Further, a manufacturing method according to the present invention comprises:

forming a plurality of scanning signal lines and opposite signal lines in parallel with each other, on an insulating substrate, and forming an insulating film layered over the scanning signal lines and opposite signal lines;

forming a plurality of display signal lines in parallel with each other on the insulating film such that the display signal lines cross the scanning signal lines and opposite signal line; and patterning a common conductive layer formed on the insulating film, thereby to form an elongated first electrode having a first end which is layered over one of the opposite signal lines so as to constitute a supplemental capacity and another end electrically connected to a crossing portion between one of the scanning signal lines and one of the display signal lines, through a switching element, and a second electrode extending substantially in parallel with the first electrode and electrically connected to the opposite signal line, in each of a plurality of pixel regions defined by regions surrounded by the scanning signal lines and display signal lines, respectively.

Further, according to a method of the present invention, a first metal film formed on the insulating substrate is patterned to form the scanning signal lines and opposite signal lines, and a second metal film formed on the insulating film is patterned to form the display signal lines, and the first and second electrodes.

Moreover, a method of manufacturing an array substrate for a liquid crystal display element, according to the present invention, comprises:

forming a plurality of scanning signal lines in parallel with each other on an insulating substrate;

forming a plurality of opposite signal lines on the insulating substrate so as to extend in parallel with the scanning signal lines and each to be arranged substantially at a center between two adjacent scanning signal lines;

forming an insulating film covering the scanning signal lines and opposite signal lines on the insulating substrate;

forming switching elements using the scanning signal lines as control terminals, on the insulating substrate;

forming contact holes at those positions of the insulating film which are opposed to the opposite signal lines;

forming a plurality of parallel display signal lines on the insulating substrate so as to extend in a direction in which the display signal lines cross the scanning signal lines and the opposite signal lines and to be connected to input terminals of the switching elements; and forming on the insulating film a first electrode connected to an output terminal of one of the switching elements and a second electrode connected to one of the opposite signal lines through the contact hole, in each of pixel regions defined by regions surrounded by the scanning signal lines and the display signal lines, respectively.

Further, a method of manufacturing an array substrate for a liquid crystal display element, according to the present invention, comprises:

forming a plurality of scanning signal lines in parallel with each other on an insulating substrate;

forming a plurality of opposite signal lines on the insulating substrate so as to extend in parallel with the scanning signal lines with a predetermined interval therebetween;

forming an insulating film covering the scanning signal lines and opposite signal lines on the insulating substrate;

forming switching elements using the scanning signal lines as control terminals, on the insulating substrate;

forming opening portions at those portion of the insulating film which are located between the scanning signal lines and the opposite signal lines;

forming contact holes at those positions of the insulating film which are opposed to the opposite signal lines;

forming a plurality of parallel display signal lines on the insulating substrate so as to extend in a direction in which the display signal lines cross the scanning signal lines and the opposite signal lines and to be connected to input terminals of the switching elements; and forming on the insulating film a first electrode connected to an output terminal of one of the switching elements and a second electrode connected to one of the opposite signal lines through the contact hole, in each of pixel regions defined by regions surrounded by the scanning signal lines and the display signal lines, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a plan view showing an array substrate of a liquid crystal display element according to a third embodiment of the present invention;

FIG. 14 is a cross-sectional view taken along the line XIV—XIV in FIG. 13;

FIG. 19 is a cross-sectional view taken along the line XIX—XIX in FIG. 17; and

FIGS. 20A to 20F are cross-sectional views respectively showing manufacturing steps of the array substrate corresponding to FIG. 18.

DETAILED DESCRIPTION OF THE INVENTION

A liquid crystal display apparatus comprising a liquid crystal display element according to the present invention will be specifically described with reference to the accompanying drawings.

Figure 1:
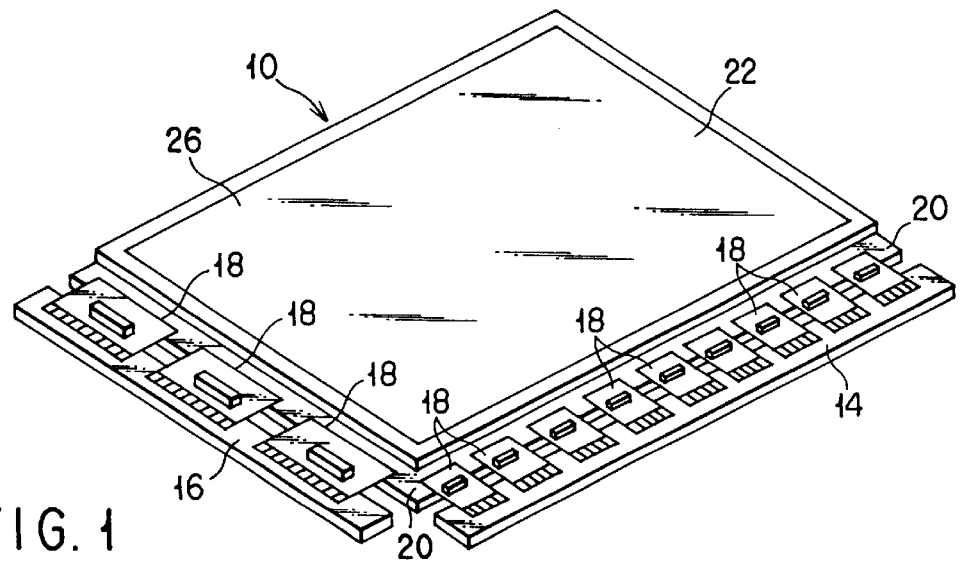
FIG. 1 is a perspective view showing a liquid display apparatus of an active matrix type according to a first embodiment of the present invention.

As shown in FIG. 1, the liquid crystal display apparatus comprises a liquid crystal display element 10 of the IPS method, a signal line drive circuit board 14 and a scanning line drive circuit board 16 for driving the liquid crystal display element, and a plurality of tape carrier packages (hereinafter referred to as TCP) 18 electrically connecting the drive circuit boards with the liquid crystal display element.

Figure 2:
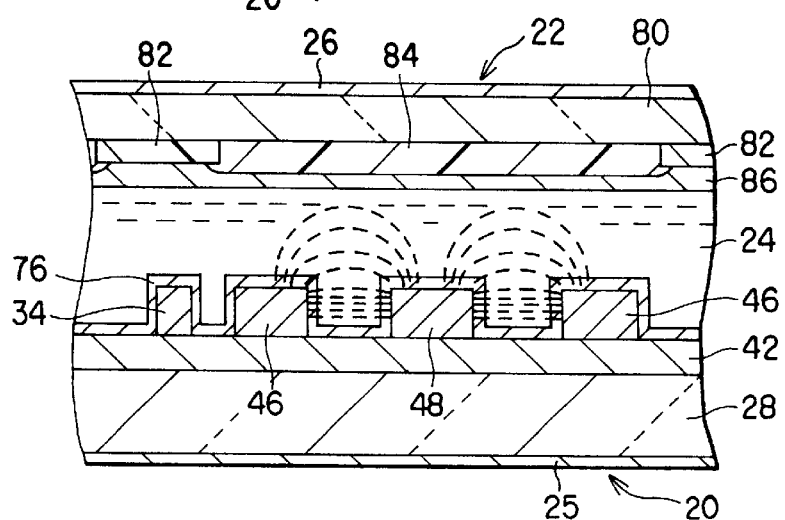
FIG. 2 is a cross-sectional view showing a liquid crystal display element in the liquid crystal display apparatus.

As shown in FIGS. 1 and 2, the liquid crystal display element 10 comprises an array substrate 20 functioning as a first substrate and an opposite substrate 22 functioning as a second substrate. These substrates 20 and 22 are arranged opposite to each other with a predetermined gap maintained therebetween, by adhering their peripheral edge portions together on each other with a sealing agent. A liquid crystal material is sealed between the array substrate 20 and the opposite substrate 22, forming a liquid crystal layer 24 as a light modulation layer. Polarization plates 25 and 26 are respectively provided on the outer surfaces of the array substrate 20 and the opposite substrate 22.

Figure 3:
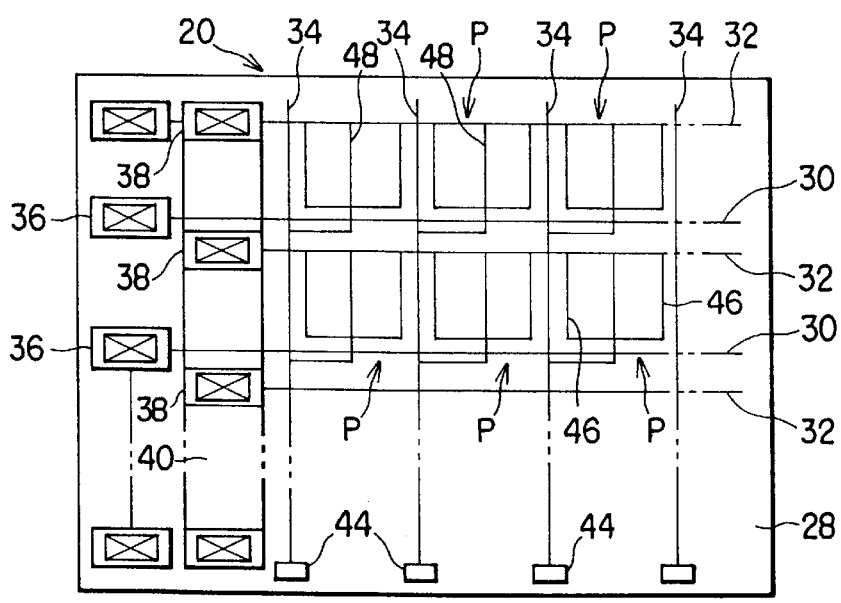
FIG. 3 is a plan view schematically showing an array substrate in the liquid crystal display element.

As shown in FIGS. 2 and 3, the array substrate 20 has a glass substrate 28 serving as an insulating substrate. On the glass substrate 28 are provided a number of scanning signal lines 30 extending in parallel with each other in the horizontal direction, a number of opposite signal lines 32 extending in parallel with each other in the horizontal direction, and a number of display signal lines 34 extending in parallel with each other in the vertical direction, that is, in the direction perpendicular to the scanning signal lines 30 and the opposite signal lines 32.

The scanning signal lines 30 and the opposite signal lines 32 are formed at 3000 angstrom from low-resistance metal material such as molybdenum-tungsten (Mo—W) alloy or the like. An end of each scanning signal line 30 is connected to a first power supply electrode 36 formed on the glass substrate 28, and an end of each opposite signal line 32 is connected to a second power supply electrode 38 formed on the glass substrate 28. The second power supply electrodes 38 are connected with each other by a power supply line 40 extending in the vertical direction. Further, the first and second power supply electrodes 36 and 38 are connected to the scanning line drive circuit board 16 through the TCPs 18.

On the array substrate 20, each region surrounded by scanning signal lines 30 and display signal lines 34 constitutes a rectangular pixel region P. Further, as shown in FIGS. 2 to 7, two opposite electrodes 46, one display pixel electrode 48, and a supplemental capacity line 50 are provided for each pixel region P. The display pixel electrode 48 is connected to the crossing portion between the scanning signal line 30 and the display signal line 34 through a thin film transistor (hereinafter referred to as TFT) of a stagger type serving as a switching element.

More specifically, display pixel electrodes 48 serving as first electrode, opposite electrodes 46 serving as second electrodes, and display signal lines 34 are provided on a gate insulating film 42 and are formed by photo-etching one same conductive layer which is an Al film having a thickness of 6000 angstrom. Note that the Al film is formed at 3000 angstrom or higher and more preferably formed at 5000 angstrom or higher.

The supplemental capacity line 50 is provided between the glass substrate 28 and the gate insulating film 42 and is formed by photo-etching the same layer as that forming the scanning signal lines 30 and the opposite signal lines 32, i.e., by photo-etching the Mo-W film.

Of each opposite signal line 32, the portion positioned at the pixel region P is formed to be wider than the other portions and constitutes a rectangular connecting portion 32a. The display electrode 48 extends in parallel with the display signal line 34 and one end portion 48a thereof extends in parallel with the opposite signal line 32 such that the electrode is formed into a T-shape as a whole. The end portion 48a is layered over the connecting portion 32a of the opposite signal line 32 and constitutes a first supplemental capacity Cs1 between the end portion 48a and the connecting portion 32a. The other end of the display pixel electrode 48 extends to the vicinity of the scanning signal line 30 and is connected to a TFT 52 described later.

Two opposite electrodes 46 extend in parallel with the display signal line 34 and are arranged on both sides of the display pixel electrode 48. The distances between the display pixel electrode 48 and the opposite electrodes 46 are set to be equal to each other. Further, an opening portion of the pixel region P is defined by the space between the display electrode 48 and each opposite electrode 46.

As is apparent from FIG. 2, each of the display pixel electrode 48 and the opposite electrodes 46 has a pair of side surfaces each of which is inclined at an angle ranging from 30° to 90° (which is the inclined angle) with respect to the glass substrate 28 and is preferably at 90°. In this manner, the side surfaces of the display pixel electrode 48 are opposed to the side surfaces of the opposite electrodes 46 with an interval D substantially in parallel with each other.

One end of each opposite electrode 46 is layered over the connecting portion 32a of the opposite signal line 32 with a gate insulating film 42 interposed therebetween and is electrically connected to the connecting portion 32a through a contact hole 56. In addition, the other end of each opposite electrode 46 extends to the vicinity of the scanning signal line 30.

A supplemental capacity line 50 which functions as a third electrode is formed substantially in a U-shape and has a base portion 50a extending in parallel with the scanning signal line 30 and a pair of projecting portions 50b projecting respectively from both ends of the base portion toward the opposite signal line 32. Further, the supplemental capacity line 50 is provided in the vicinity of the scanning signal line 30 and the pair of projecting portions 50b are respectively overlapped with the other end portions of the opposite electrodes 46 with the gate insulating film 42 interposed therebetween, thereby respectively constituting second supplemental capacities Cs2 between the portions 50b and the opposite electrodes 46. Each of the projecting portions 50b has a narrower width than the opposite electrodes 46 and is perfectly covered with the opposite electrodes. Further, the base portion 50a of the supplemental capacity line 50 is electrically connected with the other portion of the display pixel electrode 48 through a contact hole 58.

Figure 4:
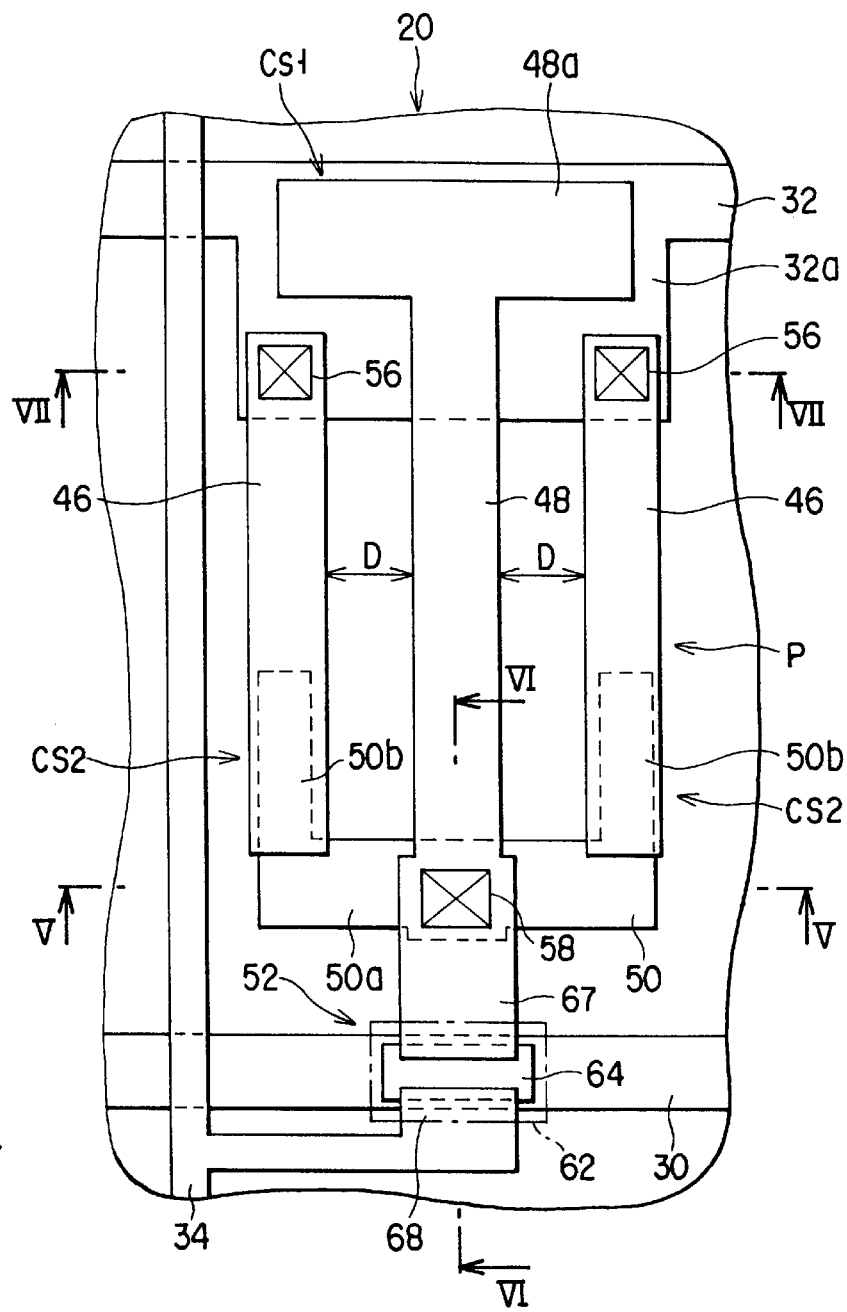
FIG. 4 is an enlarged plan view showing a pixel region of the array substrate.
Figure 5:
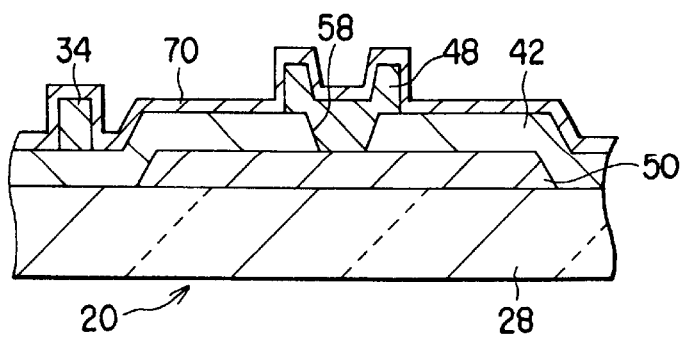
FIG. 5 is a cross-sectional view taken along the line V—V in FIG. 4.
Figure 6:
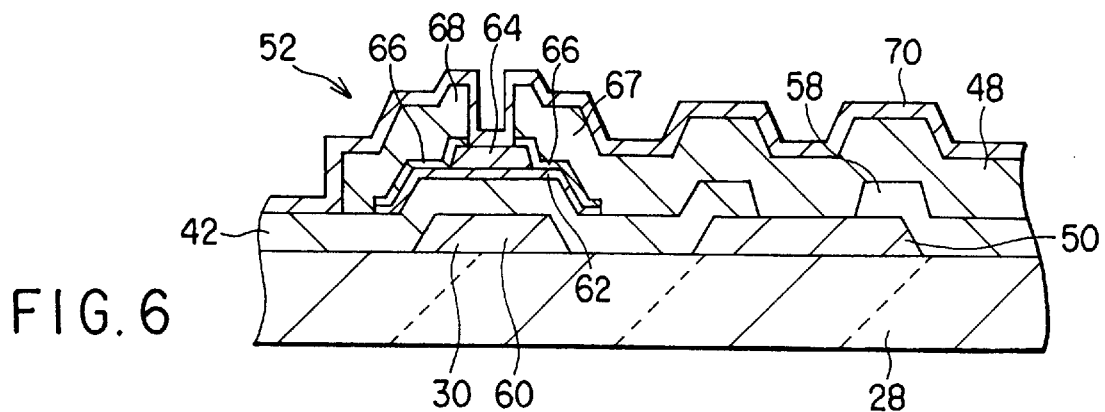
FIG. 6 is a cross-sectional view taken along the line VI—VI in FIG. 4.
Figure 7:
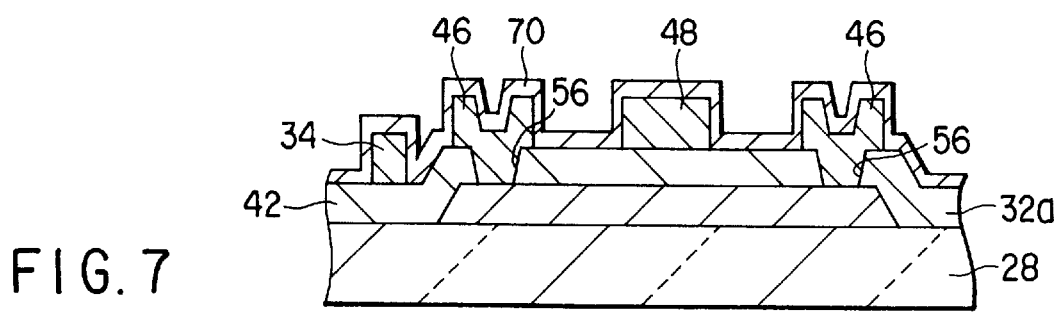
FIG. 7 is a cross-sectional view taken along the line VII—VII in FIG. 4.

As can be clearly seen from FIGS. 4 and 6, each TFT 52 uses the scanning signal line 30 itself as a gate electrode 60 and a semiconductor layer 62 made of i-type amorphous silicon (a-Si) is formed on the gate electrode with the gate insulating film 42 inserted therebetween, thus forming a channel region. In addition, a silicon nitride layer is formed on the semiconductor layer 62 and serves as a channel protection film 64 self-aligned with the scanning signal line 30.

Further, the semiconductor layer 62 is electrically connected to the display pixel electrode 48 through an n+ type a-Si film 66 and a source electrode 67 and also to the display signal line 34 through an n+ type a-Si film 66 and a drain electrode 68. Note that the source electrode 67 is formed of the same conductive film as that of the display signal line 34. Further, the entire surface of the array substrate 20 is covered with the protection film 70.

Figure 8:
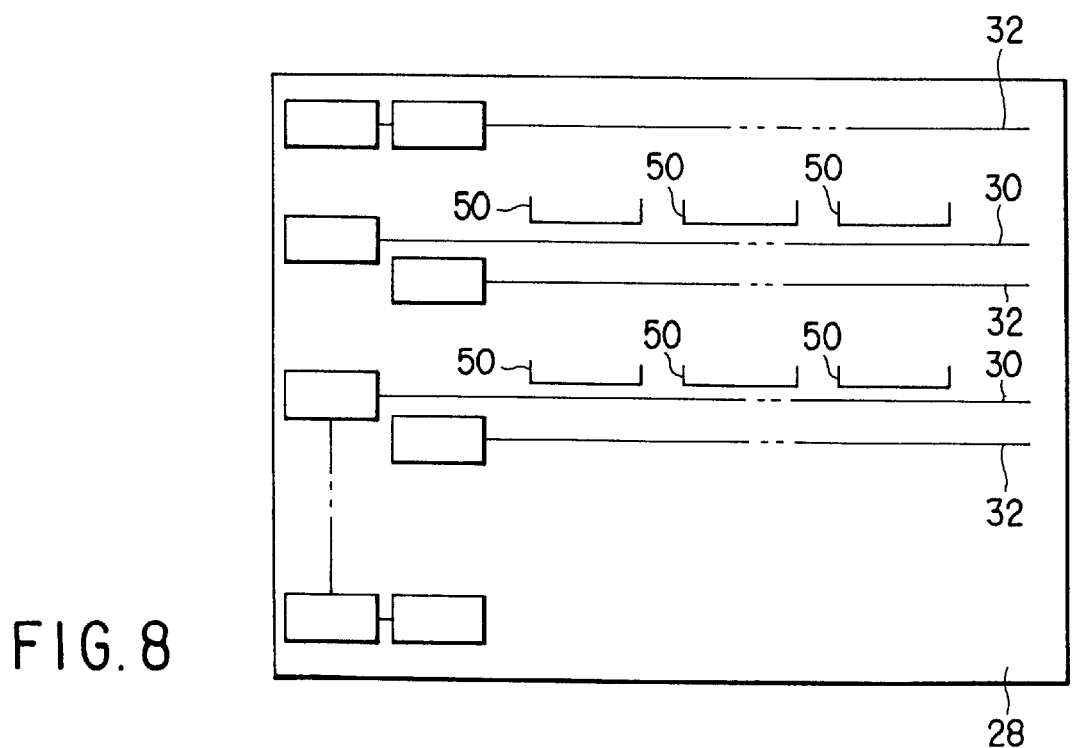
FIG. 8 is a plan view schematically showing a manufacturing step of the array substrate.

The array substrate 20 constructed in the structure described above is manufactured by the following steps. At first, as shown in FIG. 8, a Mo—W film is formed on the glass substrate 28 at a thickness of 3000 angstrom by a sputtering method, and thereafter, the Mo—W film is patterned to form gate electrodes 60, scanning signal lines 30, supplemental capacity lines 50, and parts of first and second power supply electrodes 36 and 38 with predetermined shapes.

Next, a pattern inspection is performed on the scanning signal lines 30, and thereafter, a gate insulating film made of SiO at a thickness of 3000 angstrom as well as an i-type a-Si film at a thickness of 500 angstrom as a semiconductor layer 62 for forming channel regions of the TFTs 52 are formed on the entire surface of the glass substrate 28 each by a CVD method.

Subsequently, a channel protection film 64 made of SiN for TFTs 52 is formed at 2000 angstrom by a CVD method, and only the channel protection film is thereafter processed into a predetermined shape by photo-etching. Further, an n+ type a-Si film is formed at 500 angstrom by the CVD method, and thereafter, the i type a-Si film and the n+ type a-Si film are processed into predetermined shapes by photo-etching.

Figure 9:
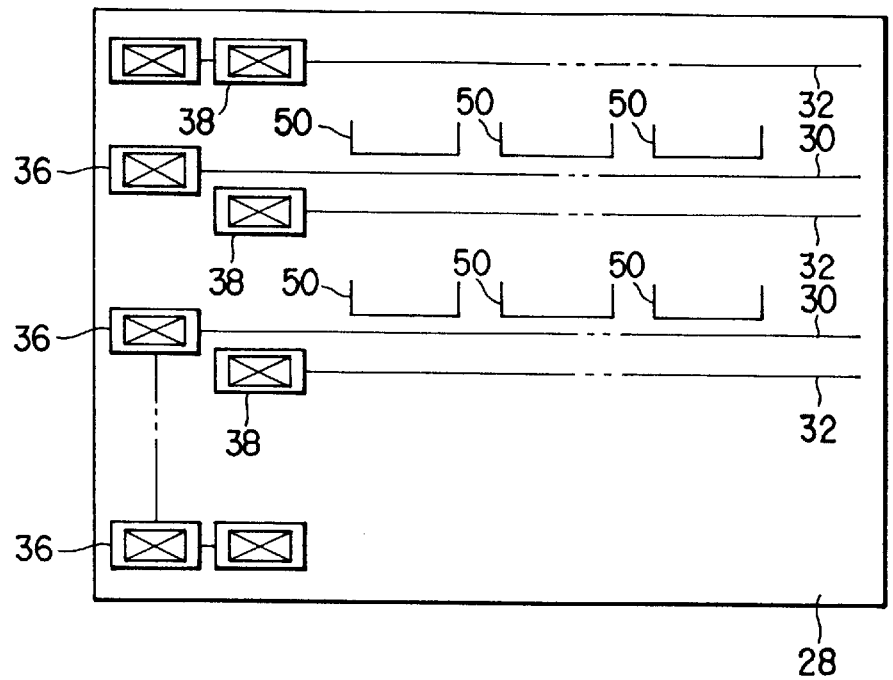
FIG. 9 is a plan view schematically showing another manufacturing step of the array substrate.
Figure 10:
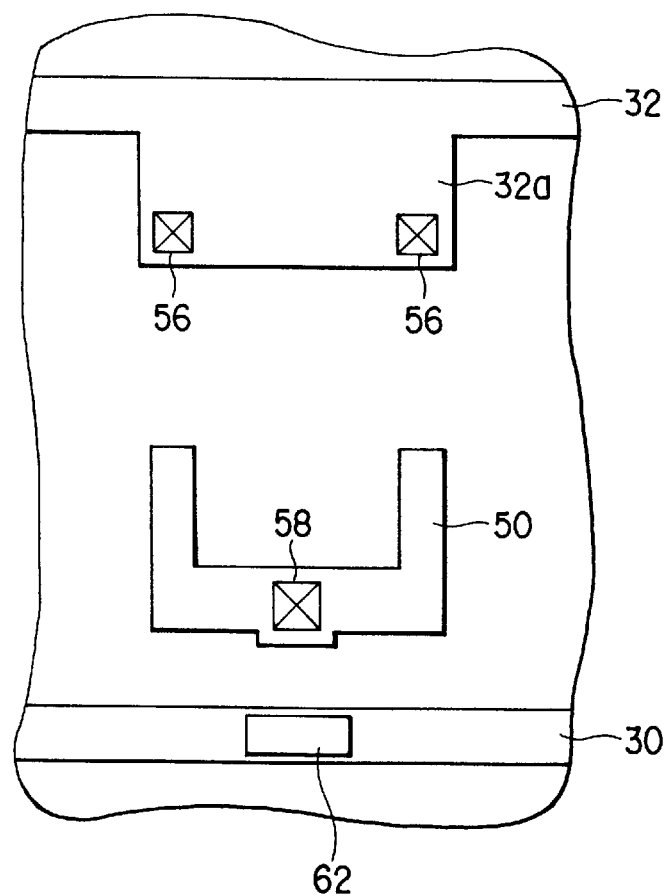
FIG. 10 is an enlarged plan view schematically showing a part of the array substrate in the manufacturing step shown in FIG. 9.

Next, as shown in FIGS. 9 and 10, contact holes for the first and second power supply electrodes 36 and 38, contact holes 56 for connecting opposite electrodes, and contact holes 58 for connecting display pixel electrodes are formed in the gate insulating film 42 by photo-etching.

Subsequently, a film of Al is formed at 6000 angstrom on the entire surface of the glass substrate 28 by the sputtering method, and thereafter, display signal lines 34, source and drain electrodes 67 and 68 for TFTs 52, display pixel electrodes 48, opposite electrodes 46, power supply lines 40 for opposite signal lines, and an n+ type a-Si film between the source and drain electrodes are processed into predetermined shapes by photo-etching, as shown in FIG. 4.

Note that anisotropic etching such as RIE (Reactive Ion Etching) is should be preferably used so that the inclined angle of the side surfaces of the display pixel electrode 48 and the opposite electrodes 46 falls within the range of 30° to 90° or preferably becomes 90°. Plasma etching or wet etching may be adopted as long as the inclined angle of the side surfaces becomes substantially 90° by optimizing the etching period and other etching conditions or the film characteristic of display signal lines and film forming conditions thereof.

At last, a protection film 70 made of Si—N is formed at 2000 angstrom by a CVD method and is thereafter processed into a predetermined shape by photo-etching. An array substrate 20 is thus completed.

Meanwhile, as shown in FIG. 2, the opposite substrate 22 comprises a transparent glass substrate 80 which functions as an insulating substrate, and a light shielding layer (or black matrix) 82 made of an oxide film is formed on the glass substrate. The light shielding layer 82 is formed like a matrix so that the TFTs 52, scanning signal lines 30, opposite signal lines 32, and display signal lines 34 on the array substrate 10 are respectively shielded from light.

On the glass substrate 80, a color filter layer 84 for red, green, and blue is formed at the positions opposing the respective pixel regions P of the array substrate 20. Further, an orientation film 86 is layered over the light shielding layer 82 and the color filter layer 84.

The opposite substrate 22 is adhered to the array substrate 20, and a liquid crystal composition material is sealed therebetween. A liquid crystal display element 10 of an active matrix type is completed.

According to the liquid crystal display element constructed as described above, the display pixel electrodes 48 and the opposite electrodes 46 on the. array substrate 20 are formed by photo-etching an Al film in one same step. The distance D between both kinds of electrodes can therefore be uniform over the entire surface of the array substrate without causing misalignment during exposure unlike in a conventional device. Accordingly, the electric field generated between the display pixel electrodes 48 and the opposite electrodes 46 can be uniform so that the response and luminance of liquid crystal are uniform at any of the opening portions respectively constituting pixels over the display area. As a result, the roughness of the screen is reduced and the display. quality of the liquid crystal display apparatus is improved.

In addition, as shown by chained line in FIG. 2, the ratio of those regions of liquid crystal which respond to the electric fields generated between the side surfaces of both kinds of electrodes in substantially parallel with the surface of the glass substrate is increased, if the display pixel electrodes 48 and the opposite electrodes 46 are thickened to 3000 angstrom or more on condition that the distance between the opposite substrate 22 and the array substrate 20 provided with the display electrodes 48 and the opposite electrodes 46 is maintained to be constant. Further, since the direction of the electric fields generated from the surface of a conductive material is vertical to this surface, the electric fields between the side surfaces of the display electrodes 48 and the opposite electrodes 46 can be more parallel to the surface of the glass substrate if the inclination angle of the side surfaces of the electrodes to the surface of the glass substrate 28 is enlarged.

Particularly, in case where the inclination angle is vertical to the surface of the glass substrate, the electric fields generated between the side surfaces of the display pixel electrodes 48 and the opposite electrodes 46 are parallel to the surface of the glass substrate and the intensity of the electric fields can be maximized. Accordingly, the response of liquid crystal can be improved without increasing the power consumption.

In addition, since each opposite electrode 46 is connected to the opposite signal line 32 through the contact hole 56, the area of the display pixel electrode end portion 48a forming part of the first supplemental capacity Cs1 is difficult to enlarge. If the area should be enlarged, the aperture ratio of the liquid crystal display element is lowered. However, according to the present embodiment, there are provided a supplemental capacity line 50 connected to the display pixel electrode 48 and applied with the same potential as the display pixel electrode, and second supplemental capacities Cs2 are formed between the display electrodes 48 and the line 50. Therefore, a sufficient supplemental capacity can be maintained.

The present invention is not limited to the above-described embodiment but can be variously modified within the scope of the present invention. For example, the display signal lines, display pixel electrodes, and opposite electrodes are not limited to Al but may be constructed in a layer structure in which Al has both surfaces sandwiched between Mo. In this case, the same operation and effect as the above-described embodiment can be obtained.

Also, the insulating film provided on the scanning signal lines is not limited to a single layer film made of SiO but may be constructed by a single layer film made of SiN or a multi-layer film consisting of SiO and SiN.

Figure 11:
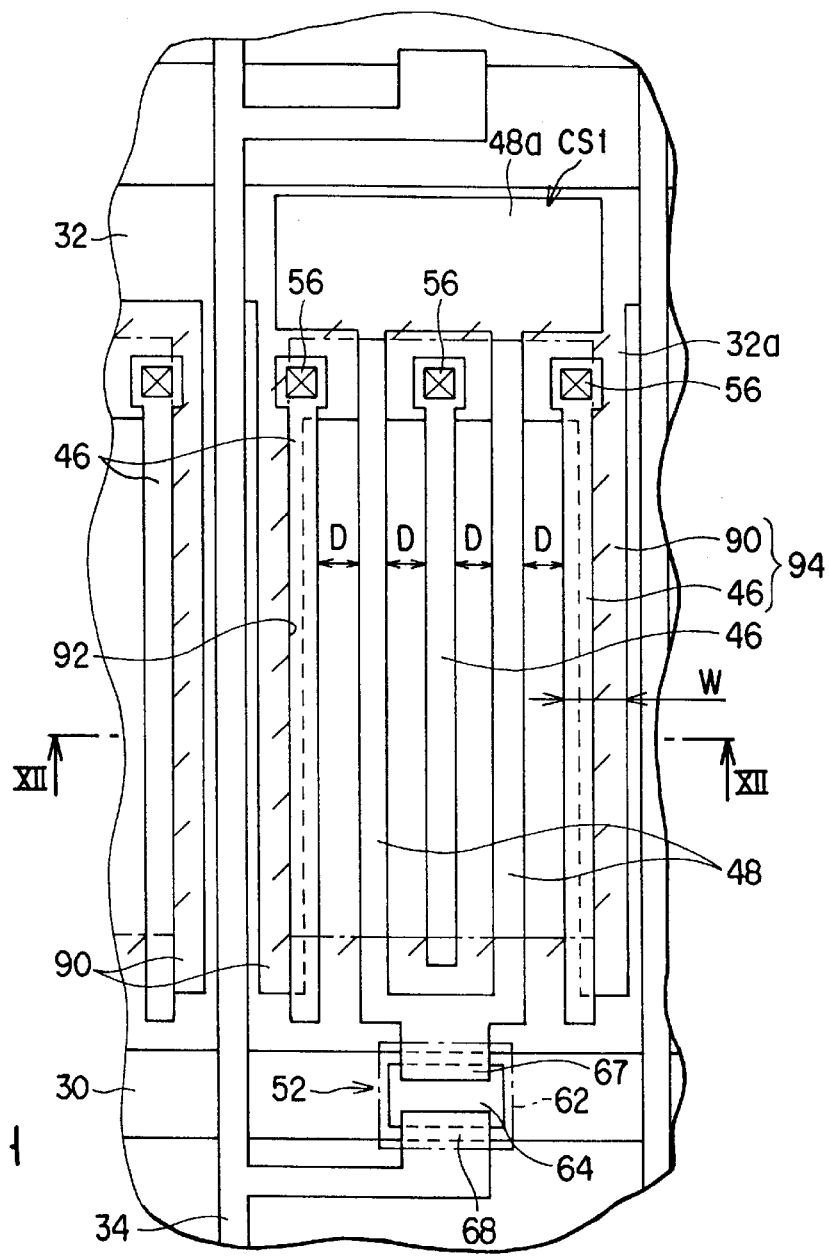
FIG. 11 is a plan view showing an array substrate of a liquid crystal display element according to a second embodiment of the present invention;.
Figure 12:
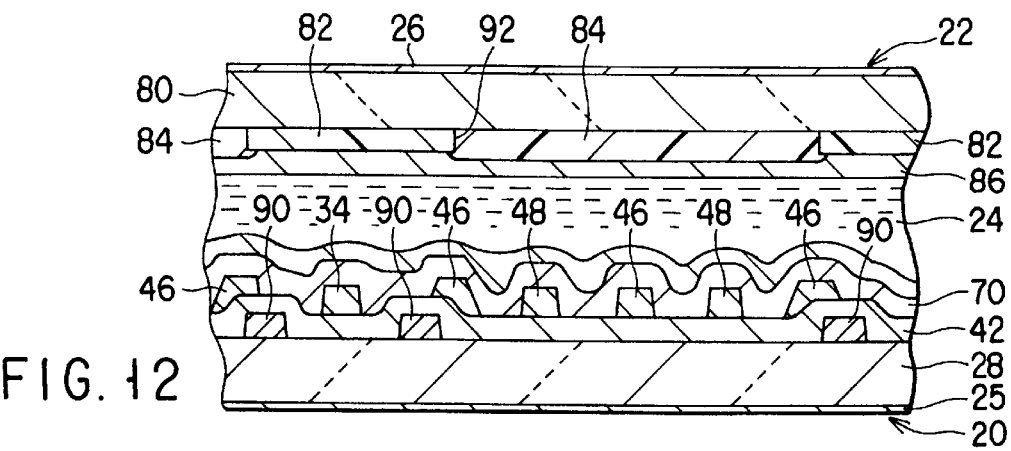
FIG. 12 is a cross-sectional view taken along the line XII—XII in FIG. 11.

FIGS. 11 and 12 show a liquid crystal display element according to a second embodiment of the present invention. The array substrate is constructed in a structure substantially equal to the embodiment described above. The portions which are the same as those of the above embodiment are denoted by same reference symbols and detailed explanation thereof will be omitted herefrom. Different portions from the above embodiment will be explained below.

As shown in FIGS. 11 and 12, on the array substrate 20, three opposite electrodes 46 extending in parallel with the display signal lines 34 and two display electrodes 48 are provided in each pixel region surrounded by a scanning signal line 30, an opposite signal line 32, and the display signal lines 34. The display pixel electrodes 48, opposite electrodes 46, and the display signal line 34 are arranged on a gate insulating film 42 and are formed at the same step by photo-etching a common conductive layer which is an Al film having a thickness of 6000 angstrom. Note that the Al film is formed at 3000 angstrom or higher in thickness and more preferably formed at 5000 angstrom or higher.

Of each opposite signal line 32, the portion positioned at the pixel region is formed to be wider than the other portions thereof and constitutes a rectangular connecting portion 32a. Two display electrodes 48 extend in parallel with the display signal lines 34 and one end portion 48a thereof extends in parallel with the opposite signal lines 32 such that the display electrode is formed in a substantially T-shape as a whole. The end portion 48a is layered over the connecting portion 32a of the opposite signal line 32 and constitutes a first supplemental capacity Cs1 between the end portion 48a and the portion 32a. The other end of the display pixel electrodes 48 extends to the vicinity of the scanning signal line 30 and is connected to a TFT 52.

The opposite electrodes 46 are provided at equal intervals and extend in parallel with the display signal lines 34. Each of the two display pixel electrodes 48 is located between two adjacent opposite electrodes. The distance D between each opposite electrode 46 and the display pixel electrode 48 adjacent thereto is set to be uniform. Further, the opening portion of the pixel region is defined by the space between each opposite electrode 46 and the display pixel electrode 48 adjacent thereto.

As is apparent from FIG. 12, each of the display pixel electrode 48 and the opposite electrodes 46 has a pair of side surfaces each of which is inclined at an angle ranging from 30° to 90° (which is the inclination angle) with respect to the glass substrate 28 and is preferably at 90°. In this manner, the side surfaces of the display pixel electrodes 48 are opposed to the side surfaces of the opposite electrodes 46 at an interval D substantially in parallel with each other.

One end of each opposite electrode 46 is layered over the connecting portion 32a of the opposite signal line 32 with the gate insulating film 42 interposed therebetween and is electrically connected to the connecting portion 32a through a contact hole 56. In addition, the other end of each opposite electrode 46 extends to the vicinity of the scanning signal line 30.

Also, according to the present embodiment, light shielding layers 90 are provided as a lower layer under the opposite electrodes 46 which are adjacent to the display signal lines 34, with the gate insulating film 42 interposed therebetween. The light shielding layers 90 are formed by photo-etching the same light shielding conductive layer as the scanning signal lines 30 and the opposite signal lines 32, i.e., the Mo—W film. The layers 90 extend in parallel with the opposite electrodes 46 from the connecting portion 32a of the opposite signal line 32 to the vicinity of the scanning signal line 30.

Each light shielding layer 90 is arranged to be layered below the gap between the opposite electrode 46 and the display signal line 34, and at least a side edge portion on the side of the opposite electrode 46 is covered by the opposite electrode 46. In a plan view, the width W of the light shielding region 94 including the opposite electrode 46 and the shielding layer 90 is set to be twice larger than the assembling error, e.g., set to 6 μm or more.

Meanwhile, as shown in FIGS. 11 and 12, the opposite substrate 22 comprises a transparent glass substrate 80 which functions as an insulating substrate, and a light shielding layer (or black matrix) 82 made of an oxide film of chromium (Cr) is formed on the glass substrate. The light shielding layer 82 is formed like a matrix so to cover the TFTs 52, scanning signal lines 30, opposite signal lines 32, and display signal lines 34 on the array substrate 20. The light shielding layer 82 also has a number of rectangular openings 92 at positions opposing to the pixel regions of the array substrate 20.

On the glass substrate 80, a color filter layer 84 for red, green, and blue is formed at each of positions opposing to the respective pixel regions P of the array substrate 20. Further, an orientation film 86 is layered over the light shielding layer 82 and the color filter layer 84.

The opposite substrate 22 constructed in this manner is adhered to the array substrate 20, and a liquid crystal composition material is sealed therebetween. A liquid crystal display element 10 of an active matrix type is thus completed. In this case, each opening 92 of the light shielding film 82 of the opposite substrate 22 is positioned such that the side edges extending in parallel with the display signal line 34 on the side of array substrate 20 are layered over the light shielding regions 94 each including the light shielding layer 90 and the opposite electrode 46.

According to the liquid crystal display element constructed as described above, like in the embodiment described before, the display pixel electrodes 48 and the opposite electrodes 46 on the array substrate are formed by photo-etching one same layer at the same step. The distance D between both kinds of electrodes can therefore be uniform over the entire surface of the array substrate without causing misalignment during exposure unlike in a conventional device. Accordingly, the electric fields generated between the display pixel electrodes 46 and the opposite electrodes 46 can be uniform so that the response and luminance of liquid crystal are uniform at any of the opening portions respectively constituting pixels, over the display area. As a result, the roughness of the screen is reduced and the display quality of the liquid crystal display apparatus is improved.

Also, according to the present embodiment, light shielding layers 90 are arranged to cover gaps between the display signal lines 34 and opposite electrodes 46 with the gate insulating film 42 interposed therebetween in each of the pixel regions of the array substrate. Therefore, while electrically insulating the display signal lines and the opposite electrodes, the width of the light shielding region 94 can be enlarged without lowering the aperture ratio of the pixel region. Accordingly, even if a positional offset appears more or less between the array substrate 20 and the opposite substrate 22, the side edges of the openings 92 of the light shielding layer 82 on the opposite substrate side can be securely positioned to be opposed to the light shielding region.94. As a result of this, neither the aperture ratio nor the luminance of the liquid crystal display element is caused. The power consumption of the back light is not required to compensate for such lowering of the aperture ratio or luminance, and leakage of light caused by a positional offset can be prevented. In this manner, it is possible to provide a liquid crystal display element with excellent display quality.

In addition, according to the present embodiment, the same operation and effect as the embodiment described before can be obtained.

Although the above-described embodiment is arranged such that the light shielding layers 90 are formed of the same layer as the opposite signal lines 32 and are electrically connected to the opposite signal lines, the light shielding layers need not always be electrically connected to the opposite signal lines or may be formed of a layer different from that forming the opposite signal lines.

In the above embodiment, the display signal lines, display pixel electrodes, and opposite electrodes are formed of Al, but may be formed of transparent electrodes such as ITO. In this case, an assembling error is ranged in the regions wherein the light shielding layers 90 and opposite electrodes 46 are overlapped with each other.

Next, explanation will be made of a liquid crystal display element according to a third embodiment of the present invention. The array substrate 20 of the liquid crystal display element according to the third embodiment differs from the first embodiment in that each opposite signal line 32 is positioned substantially at the center between two adjacent scanning signal lines 30 and that an end of the pixel electrode 48 is layered over a scanning signal line 30, thereby forming a supplemental capacity.

Figure 15:
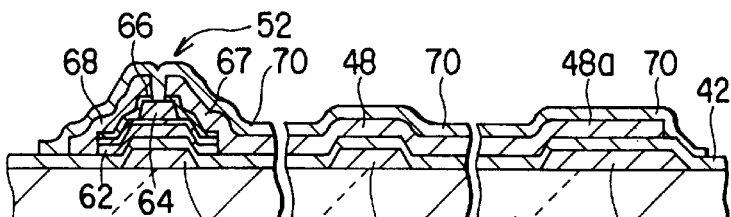
FIG. 15 is a cross-sectional view taken along the line XV—XV in FIG. 13.

Specifically, as shown in FIGS. 13 and 15, the array substrate 20 has a glass substrate 28 which functions as an insulating substrate. On the glass substrate 28 are provided a number of scanning signal lines 30 extending in parallel with each other in the horizontal direction and a number of opposite signal lines 32 extending in parallel with each other in the horizontal direction. Each of the opposite signal lines 32 is located at the substantially central position between two adjacent scanning signal lines 30. Each opposite signal line 32 need only be provided at the position which is apart from the scanning signal lines 30 adjacent thereto by at least 10 $\mu$m or more or preferably 20 $\mu$m or more, i.e., at the substantially central position between the two scanning signal lines adjacent to the signal line.

The scanning signal lines 30 and opposite signal lines 32 are formed by pattering one same metal film formed on the glass substrate 28 and made of, for example, molybdenum-tungsten alloy (Mo—W) or aluminum (Al) alloy.

Also, on the glass substrate 28, a gate insulating film 42 made of, for example, SiO is formed to be layered on the scanning signal lines 30 and the opposite signal lines 32. Further, a number of display signal lines 34 are provided on the gate insulating film 42 and extend in parallel with each other in the vertical direction, i.e., in the direction perpendicular to the scanning signal lines 30 and the opposite signal lines 32. The display signal lines 34 are formed, for example, by patterning a layered film consisting of molybdenum and aluminum at 6000 angstrom in thickness.

On the array substrate 20, each region surrounded by scanning signal lines 30 and display signal lines 34 constitutes a rectangular pixel region P. Three opposite electrodes 46 and two display pixel electrodes 48 are provided for each pixel region P. An end of each display pixel electrode 48 is connected to a crossing portion between a scanning signal line 30 and a display signal line 34, through a TFT 52 constituting a switching element.

More specifically, the display pixel electrodes 48 which function as first electrodes, the opposite electrodes 46 which function as second electrodes, and the display signal lines 34 are provided on a gate insulating film 42 and are formed by patterning one same conductive layer which is a layered film of 6000 angstrom in thickness consisting of molybdenum and Al. These electrodes and lines extend in parallel with each other.

Among the two adjacent scanning signal lines 30 defining a pixel region P, the scanning signal line on the side opposite to the scanning signal line on the side where the TFT 52 corresponding to the pixel region P is provided has a rectangular connecting portion 30a projecting into the pixel region. The two display pixel electrodes 48 has an end portion 48a extending in parallel with the scanning signal line 30 and is formed in a substantially T-shape as a whole. The end portion 48a is layered over the connecting portion 30a of the scanning signal line 30 with the gate insulating film 42 interposed therebetween, thereby constituting a first supplemental capacity Cs1. The other ends of the display pixel electrodes 48 extend to the vicinity of the other scanning signal line 30 and are connected to the TFT 52 described later.

Three opposite electrodes 46 extend in parallel with the display signal lines 34, and one of which is located between the display pixel electrodes 48 and each of the remaining two electrodes is located between the display pixel electrode and the display signal line 34. The intervals D between the adjacent opposite electrode 46 and display pixel electrode 48 are set to be uniform, e.g., to be 7 $\mu$m or more. The opening portions of each pixel region P are defined the spaces between the opposite and display pixel electrodes.

Also, three opposite electrodes 46 are electrically connected to an opposite signal line 32 through contact hole 96 formed in the gate insulating film 42. In the present embodiment, the opposite signal line 32 is provided so as to cross the substantially central portions of the pixel electrodes 48 and the opposite electrodes 46 in the longitudinal direction thereof.

The TFT 52 has the same structure as that in the first embodiment described before. The same portions as those in the first embodiment are denoted by the same reference symbols and detailed explanation thereof will be omitted. In addition, the display signal lines 34, display pixel electrodes 48, opposite electrodes 46, and TFTS 52 are covered with a protection film 70 provided along their own contours.

The array substrate 20 constructed in this manner will be manufactured in the following steps.

Figure 16A:
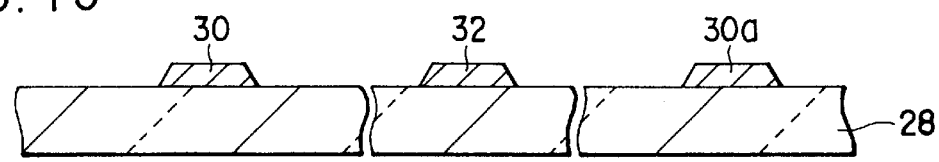
FIGS. 16A to 16F are cross-sectional views respectively showing manufacturing steps of the array substrate corresponding to FIG. 14.

At first, as shown in FIG. 16A, a Mo—W alloy film is formed on a glass substrate 28 at a thickness of 250 nm by a sputtering method. Photoresist is applied on the surface of the Mo—W alloy film and is exposed through a first mask pattern not shown. By developing the photoresist, unnecessary regions of the photoresist are removed therefrom. Predetermined regions of the Mo—W alloy film, which are exposed through the photoresist, are removed by etching. Thereafter, the remaining photoresist is peeled.

By this patterning based on photolithography, a number of scanning signal lines 30 parallel to each other and a number of opposite signal lines 32 each positioned between adjacent scanning signal lines are formed simultaneously together.

At this time, the scanning signal lines 30 and the opposite signal lines 32 which are supplied with different voltage signals are arranged sufficiently apart from each other. Therefore, the possibility of conductance between those signal lines can be lowered even if contaminants stick to the photoresist or mask pattern during patterning based on photolithography.

Figure 16B:
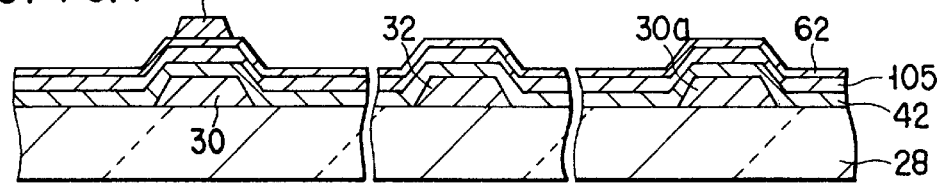

Subsequently, as shown in FIG. 16B, a gate insulating film 42 made of a silicon nitride film at 350 nm in thickness is formed on the entire surface of the glass substrate 28 by a plasma CVD method. Further, on the gate insulating film 42, a second gate insulating film 105 made of silicon nitride film at 50 nm in thickness is formed by the plasma CVD method. Then, a semiconductor layer 62 made of an amorphous silicon (a-Si:H) film at 50 nm in thickness is formed by the plasma CVD method. A channel protection film 64 made of a silicon nitride film at 300 nm in thickness is formed by the plasma CVD method.

Next, back-surface exposure is performed on the channel protection film 64 with the scanning signal lines 30 used as a mask, and thereafter, patterning based on photolithography is performed likewise with use of a second mask pattern not shown, to form an island-like channel protection film 64.

Figure 16C:
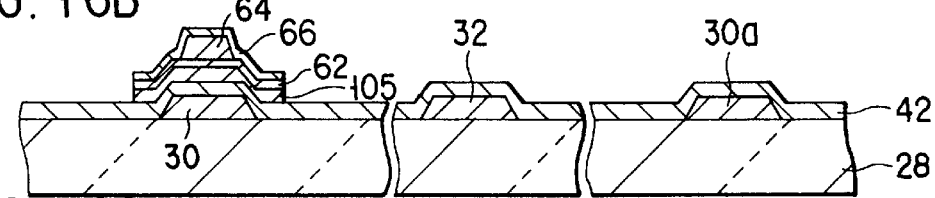

Subsequently, as shown in FIG. 16C, n+ a-Si:H film 66 of 50 nm in thickness containing phosphorus as impurities is formed on the semiconductor layer 62 and the channel protection film 64, by the plasma CVD method. The n+ a-Si:H film 66, semiconductor layer 62, and second gate insulating film 105 are patterned with use of a third mask pattern not shown by photolithography, to form an island-like n+ a-Si:H film 66, a semiconductor film 62, and a second gate insulating film 105.

Figure 16D:
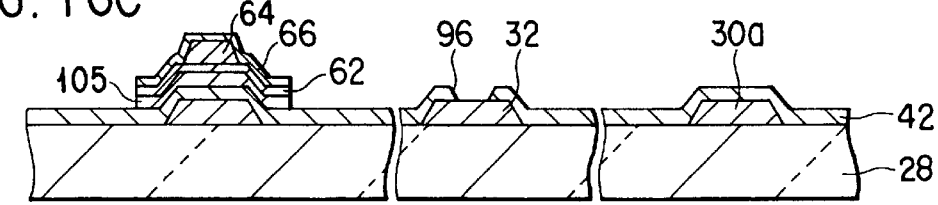

Subsequently, as shown in FIG. 16D, patterning based on photolithography is performed with use of a fourth mask pattern not shown, to form contact holes 96 in the gate insulating film 42 on the opposite signal lines 32.

Figure 16E:
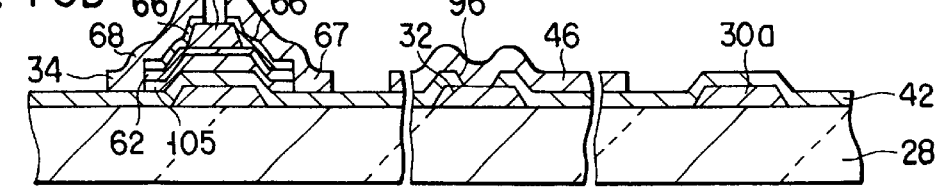

Next, as shown in FIG. 16E, films of Mo, Al, and Mo are sequentially formed respectively at 50, 200, and 50 nm, on the entire surface of the glass substrate 28 by a sputtering method, to form a multi-layered film consisting of Mo and Al. This Mo—Al—Mo layered film and the n+ a-Si:H film 66 are subjected to patterning based on photolithography with use of a fifth mask pattern not shown, to form a display signal lines 34 integral with source electrodes 68 serving as input terminals, pixel electrodes 48 integral with drain electrodes 67 serving as output terminals, and opposite electrodes 46 and to remove simultaneously the portion of the n+ a-Si:H film 66 between the source and drain electrodes of TFTs 52. In this manner, the opposite electrodes 46 are electrically connected to the opposite signal line 32 through the contact holes 96.

Figure 16F:
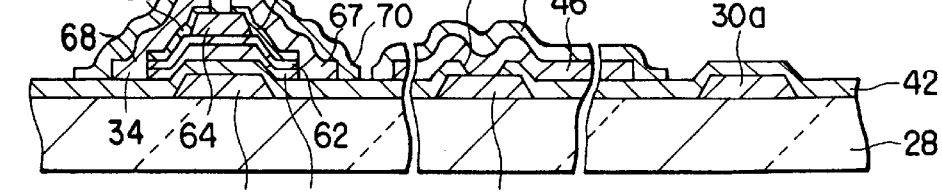

Thereafter, as shown in FIG. 16F, a silicon nitride film at 200 nm in thickness is formed on the entire surface of the glass substrate 28 by the plasma CVD method. This silicon nitride film is patterned by photolithography with use of a sixth mask pattern not shown, to form a protection film 70. The protection film 70 is formed so as to cover individually the display signal lines 34, pixel electrodes 48, and opposite electrodes 46 in compliance with their own shapes. An array substrate 20 is thus completed.

If the Mo—Al—Mo layered film is etched with use of the same pattern after the protection film 70 is formed, it is possible to prevent defective short-circuiting between the pixel electrodes 48 and the opposite electrodes 46 or between the display signal lines 32 and the opposite electrodes 46, which are formed in one same layer without increasing a photolithography step.

Specifically, undesired conductance between lines can be prevented by removing the Mo—Al—Mo layered film which is not covered by the protection film 70 but is exposed without increasing the number of manufacturing steps, even if conductance appears due to contaminants sticking to the photoresist or mask pattern when patterning based on photolithography is performed in the step in which the display signal lines 34, pixel electrodes 48, and opposite electrodes 46 which are respectively supplied with voltage signals different from each other are formed.

As has been described above, according to the array substrate of the third embodiment, the scanning signal lines 30 and the opposite signal lines 32 which are supplied with voltages different from each other are simultaneously formed by patterning one same conductive layer on an insulating substrate. The scanning signal lines and opposite signal lines formed at this time are arranged sufficiently apart from each other, e.g., as about four times apart as in a conventional device. Therefore, even if contaminants or the like stick to the photoresist or mask pattern during patterning based on photolithography, short-circuiting can be prevented. In comparison with a conventional device which involves provability of short-circuiting at 3 to 5%, the present embodiment realizes 0.5% and defective display caused by short-circuiting can be reduced so that the manufacturing yield of array substrates can be greatly improved.

According to the array substrate 20 constructed as described above, like the other embodiments described before, the display pixel electrodes 48 and the opposite electrodes 46 are formed of one same layer on the gate insulating film 42. Therefore, the distance D between both kinds of the electrodes can therefore be uniform over the entire surface of the array substrate without causing misalignment during exposure, unlike in a conventional device. Accordingly, the electric fields generated between the display pixel electrodes 48 and the opposite electrodes 46 can be uniform so that the response and luminance of liquid crystal are uniform at any of the opening portions respectively constituting pixels over the display area. As a result, the roughness of the screen is reduced and the display quality of the liquid crystal display apparatus is improved.

Further, according to the array substrate described above, the display signal lines, pixel electrodes, and opposite electrodes which are supplied with voltages different from each other are formed simultaneously by patterning a second metal film formed in the same layer on the insulating film. Further, the display signal lines, pixel electrodes, and opposite electrodes are covered with a protection film along the shapes of the lines and electrodes. The display signal lines and opposite electrodes or the pixel electrodes and opposite electrodes are arranged relatively close to each other. Short-circuiting therefore may occur if contaminants or the like sticks to the photoresist or mask pattern. Such short-circuiting, however, can be prevented by etching and removing the second metal film which is not covered with the protection film but is exposed after covering the lines and electrodes with the protection film.

The array substrate 20 thus formed and an opposite substrate having the same structure as the first embodiment are arranged to be opposed to each other, and liquid crystal composition material is sealed between these substrates, thereby constituting a liquid crystal display element. In the liquid crystal display element constructed with use of an array substrate in which the electric fields generated between, the display pixel electrodes 48 and the opposite electrodes 46 are uniform and short-circuiting of lines is reduced, occurrence of defective display is prevented so that color images with excellent display quality can be displayed.

Next, explanation will be made of a liquid crystal display element according to a fourth embodiment of the present invention. The array substrate of the liquid crystal display element according to the fourth embodiment has a glass substrate 28 which functions as an insulating substrate. On the glass substrate 28 are provided a number of scanning signal lines 30 extending in parallel with each other in the horizontal direction, and a number of opposite signal lines 32 also extending in parallel with each other along the horizontal direction. In the present embodiment, each opposite signal line 32 is provided to be adjacent to one scanning signal line 30, like in the first embodiment.

The scanning signal lines 30 and opposite signal lines 32 are formed by patterning one same metal film formed on the glass substrate 28, which is made of molybdenum-tungsten alloy (Mo—W) or aluminum (Al), for example.

On the glass substrate 28 is formed a gate insulating film 42 made of, for example, SiO so as to cover the scanning signal lines 30 and the opposite signal lines 32. Further, on the gate insulating film 42 are provided a number of display signal lines 34 extending in parallel with each other in the vertical direction, i.e., in the direction perpendicular to the scanning signal lines 30 and the opposite signal lines 32. The display signal lines 34 are formed, for example, by patterning a multi-layered film consisting of molybdenum and aluminum and formed at 6000 angstrom in thickness.

On the array substrate 20, each region surrounded by scanning signal lines 30 and display signal lines 34 constitutes a rectangular pixel region P. Three opposite electrodes 46 and two display pixel electrodes 48 are provided for each pixel region P. Each display pixel electrode 48 is connected to a crossing portion between a scanning signal line 30 and a display signal line 34, through a TFT 52 constituting a switching element.

More specifically, display pixel electrodes 48, opposite electrodes 46, and display signal lines 34 are provided on the gate insulating film 42 and are formed by patterning one same conductive layer formed of a multi-layered film of 6000 angstrom in thickness consisting of molybdenum and Al. These electrodes and lines extend in parallel with each other.

That portion of each opposite signal line 32 which is positioned at the pixel region P is shaped to be wider than the other portions thereof and constitutes a rectangular connecting portion 32*a*. The display pixel electrodes 48 extend in parallel with the opposite signal line 32 and have an end portion 48*a* extending in parallel to the opposite signal line 32, thus being formed in a T-shape as a whole. The end portion 48*a* is layered over the connecting portion 32*a* of the opposite signal line 32 with the gate insulating film 42 interposed therebetween, and constitutes a supplemental capacity Cs1 between the end portion 48*a* and the portion 32*a*. The other ends of the display pixel electrodes 48 extend to the vicinity of the scanning signal line 30 and is connected to the TFT 52.

Three opposite electrodes 46 extend in parallel with the display signal lines 34, and one of these electrodes is provided between the display pixel electrodes 48 while each of the other two electrodes is provided between a display pixel electrode and a display signal line 34. The interval between an opposite electrode 46 and a display pixel electrode 48 adjacent to each other is set to be uniform, e.g., to be 7 μm or more. Further, the opening portions of the pixel region P are defined by the spaces between the opposite electrodes 46 and the display pixel electrodes 48, respectively.

End portions of three opposite electrodes 46 on the side of the opposite signal line 32 are electrically connected to the connecting portion 32*a* of the opposite signal line 32 through contact holes 96 formed in the gate insulating film 42. According to the present embodiment, in each pixel region P, the opposite signal line 32 is positioned to be adjacent to one of the scanning signal lines 30.

Further, in each pixel region P, an elongated opening 115 is formed in the gate insulating film 42 between the opposite signal line 32 and the scanning signal line 30 provided adjacent to the opposite signal line, and extends in parallel with the opposite signal line. The opening 115 reaches the surface of the glass substrate 28. In case where an opening 115 is thus provided, even if short-circuiting occurs between the scanning signal line 30 and the opposite signal line 32 provided adjacent to each other, the portion of the metal film causing the short-circuiting is exposed and the short-circuiting portion of the metal film can be removed by later etching processing on the metal film, since the gate insulating film 42 is removed. Accordingly, it is possible to prevent effectively the short-circuiting between the scanning signal line and the opposite signal line 32 which are supplied with different voltages and are provided adjacent to each other.

The TFT 52 has the same structure as that in the first embodiment described before. The same portions as those in the first embodiment are denoted by same reference symbols and detailed explanation thereof will be omitted. In addition, the display signal lines 34, display pixel electrodes 48, opposite electrodes 46, and TFTs 52 are covered with a protection film 70 provided along their own contours.

Next explanation will be made of manufacturing process of the array substrate 20 having the above-mentioned structure. At first, as shown in FIG. 20A, a Mo—W alloy film is formed on the glass substrate 28 at a thickness of 250 nm by a sputtering method, and thereafter, a molybdenum film is formed at 50 nm in thickness on the aluminum alloy film, thereby to form an aluminum-alloy-film-molybdenum film as a first metal film. Photoresist is applied on the surface of the molybdenum film and is thereafter exposed through a first mask pattern not shown. By developing the photoresist, unnecessary regions of the photoresist are removed to expose partially the aluminum-alloy-film-molybdenum-film. In this state, the aluminum-alloy-film-molybdenum-film is etched and then the photoresist is peeled.

By this patterning based on photolithography, a number of scanning signal lines 30 and a number of opposite signal lines 32 are formed simultaneously together on the glass substrate 28. Also, the connecting portions 32a are formed integrally with each opposite signal line 32.

Subsequently, as shown in FIG. 20B, a gate insulating film 42 made of a silicon nitride film at 350 nm in thickness is formed on the entire surface of the glass substrate 28 by a plasma CVD method. Further, on the gate insulating film 42, a semiconductor film 62 made of an amorphous silicon (a-Si:H) film at 50 nm in thickness is formed by the plasma CVD method. A channel protection film 64 made of a silicon nitride film at 300 nm in thickness is formed on the semiconductor film 62 by the plasma CVD method. Thereafter, back-surface exposure is performed on the channel protection film 64 with scanning signal lines 30 used as a mask, and thereafter, patterning based on photolithography is performed likewise with use of a second mask pattern not shown, to form the channel protection film 64 into an island-like pattern.

Subsequently, as shown in FIG. 20C, an n+ a-Si:H film 66 of 50 nm in thickness containing phosphorus as impurities is formed on the semiconductor layer 62 and the channel protection film 64, by the plasma CVD method. The n+ a-Si:H film 66 and the semiconductor layer 62 are patterned with use of a third mask pattern not shown by photolithography, to form the n+ a-Si:H film 66 and semiconductor film 62 into an island-like pattern.

Figure 17:
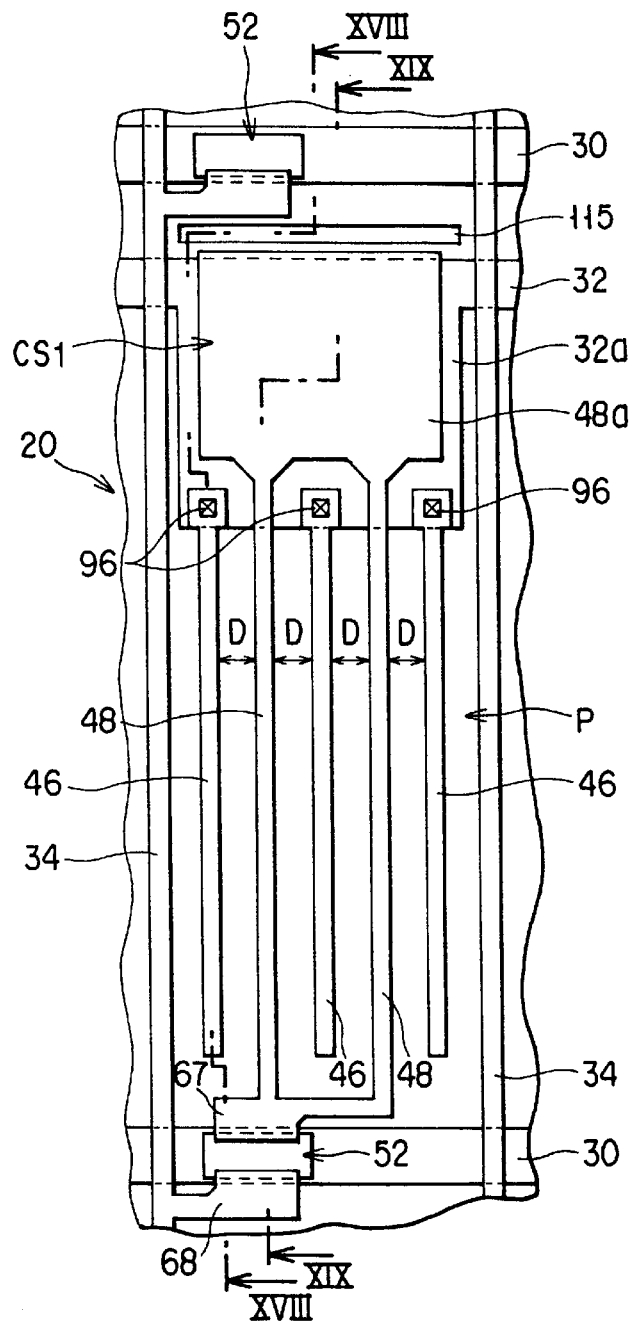
FIG. 17 is a plan view showing an array substrate of a liquid crystal display element according to a fourth embodiment of the present invention.
Figure 18:
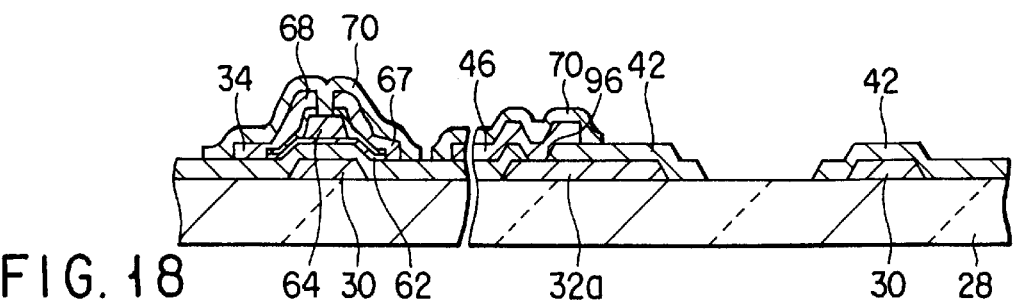
FIG. 18 is a cross-sectional view taken along the line XVIII—XVIII in FIG. 17.

Next, as shown in FIG. 20D, patterning based on photolithography is performed with use of a fourth mask pattern not shown, to form contact holes 96 in the gate insulating film 42 on the opposite signal line 32. Simultaneously, those portions of the gate insulating film 42 which are located between the scanning signal lines 30 and the opposite signal lines 32 are bored to form opening 115 shown in FIG. 17, respectively. Each opening 115 is formed so as to reach the surface of the glass substrate 28.

Subsequently, as shown in FIG. 20E, films of Mo, Al, and Mo are sequentially formed respectively at 50, 200, and 50 nm, on the entire surface of the glass substrate 28 by a sputtering method, to form a multi-layered film consisting of Mo and Al. This Mo—Al—Mo layered film and the n+ a-Si:H film 66 are subjected to patterning based on photolithography with use of a fifth mask pattern not shown, to form display signal lines 34 integral with source electrodes, 68, pixel electrodes 48 integral with drain electrodes 67, and opposite electrodes 46 and to remove simultaneously those portion of the n+ a-Si:H film 66 which are located between the source and drain electrodes of the TFTs 52. In this manner, the opposite electrodes 46 are electrically connected to the opposite signal line 32 through the contact holes 96.

Thereafter, as shown in FIG. 20F, a silicon nitride film at 200 nm in thickness is formed on the entire surface of the glass substrate 28 by the plasma CVD method. This silicon nitride film is patterned by photolithography with use of a sixth mask pattern not shown, to form a protection film 70. The protection film 70 is formed so as to cover individually the display signal lines 34, pixel electrodes 48, and opposite electrodes 46 in compliance with their own shapes. An array substrate 20 is thus completed.

If the aluminum-alloy-film-molybdenum film serving as a first metal film is etched with use of the same mask pattern after the protection film 70 is formed, it is possible to prevent defective short-circuiting between the scanning signal line 30 and the opposite signal line 32 which are formed adjacent to each other in one same layer, without increasing a photolithography step.

Specifically, even if conductance appears due to contaminants sticking to the photoresist or mask pattern when patterning based on photolithography is performed on the formed first metal film in the step in which the scanning signal lines 30 and opposite signal lines 32, which are respectively supplied with voltage signals different from each other, are formed on the glass substrate 28, undesired conductance between the scanning and opposite signal lines can be prevented by removing those portions of the first metal film that are not covered by the gate insulating film 42 but are exposed through the openings 115, without increasing the number of manufacturing steps.

Further, if the Mo—Al—Mo layered film as a second metal film is etched with use of the same mask pattern after the protection film 70 is formed, it is possible to prevent defective short-circuiting between the pixel electrodes 48 and the opposite electrodes 46 or between the display signal lines 32 and the opposite electrodes 46, which are formed in one same layer, without increasing a photolithography step.

Specifically, even if conductance appears due to contaminants sticking to the photoresist or mask pattern when patterning based on photolithography is performed in the step in which the display signal lines 34, pixel electrodes 48, and opposite electrodes 46, which are respectively supplied with voltage signals different from each other, are formed, undesired conductance between signal lines and electrodes can be prevented by removing those portions of the Mo—Al—Mo layered film which are not covered by the protection film 70 but are exposed, without increasing the number of manufacturing steps.

In addition, in the step in which the Mo—Al—Mo layered film as a second metal film is etched as described above, an exposed aluminum-alloy-film-molybdenum film serving as a first metal film can be etched simultaneously.

As has been described above, according to the array substrate of the present embodiment, even if defective short-circuiting occurs between the scanning signal line and the opposite signal line, the. conductive portion of the scanning signal line 30 and the opposite signal line 32 can be removed by providing an opening 115 penetrating to the surface of the glass substrate 28 and by thereafter etching the second metal film formed on the gate insulating film 104, through the opening 115. Accordingly, in comparison with a conventional device which involves provability of short-circuiting at 3 to 5%, the present embodiment reduces the provability to 0.5% so that the manufacturing yield of array substrates can be greatly improved.

Further more, according to the fourth embodiment, the same operation and effect as those of the third embodiment can be obtained, and it is possible to achieve a liquid crystal display element which has excellent display quality and reduces short-circuiting of lines by constructing the liquid crystal display element in combination with an opposite substrate similar to the first embodiment.

Note that the present invention is not limited to the embodiments described above but can be modified variously within the scope of the invention. For example, it is needless to say that the semiconductor film may be made of a polycrystal silicon film although the semiconductor film is made of amorphous silicon in the above described embodiments. Also, the structure may be arranged such that the drive circuit sections are integrally formed on the peripheral region of the surface of the glass substrate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An array substrate for a liquid crystal display element, comprising:

a substrate;

a plurality of scanning signal lines and opposite signal lines arranged in parallel with each other, on the substrate;

a plurality of display signal lines arranged in parallel with each other on the scanning signal lines and the opposite signal lines, with an insulating film interposed therebetween, the display signal lines extending in a direction crossing the scanning signal lines and opposite signal line; and a plurality of pixel regions defined by regions surrounded by the scanning signal lines and display signal lines, respectively;

each of the pixel regions including an elongated first electrode having an end which is layered over one of the opposite signal lines so as to constitute a supplemental capacity and another end electrically connected to a crossing portion between one of the scanning signal lines and one of the display signal lines, through a switching element, a second electrode extending substantially in parallel with the first electrode and electrically connected to the opposite signal line, and a third electrode which is overlapped with the second electrode with the insulating layer interposed therebetween, so as to constitute another supplemental capacity and electrically connected to the first electrode, the first and second electrodes being formed by processing one same conductive layer.

2. A substrate according to claim 1, wherein the display signal lines, the first electrodes, and the second electrodes are provided on the insulating film and are formed by processing one same conductive layer, and, in each of the pixel regions, the second electrode is electrically connected to the opposite signal line through a contact hole formed in the insulating film.

3. A substrate according to claim 1, wherein each of the pixel regions is provided with a plurality of second electrodes each of which is same as the second electrode, and, in each of the pixel regions, the first electrode is provided between adjacent two of the second electrodes such that an equal interval is maintained between the first electrode and each of the two second electrodes.

4. A substrate according to claim 1, wherein, in each of the pixel regions, the first electrode has an end portion constituting a supplemental capacity line extending in parallel with the opposite signal line in a direction perpendicular to the second electrode.

5. A substrate according to claim 1, wherein the insulating film has a single-layer structure or a multi-layered structure containing at least silicon nitride.

6. A substrate according to claim 1, wherein the first and second electrodes are formed of a film having a thickness of 3000 angstrom or more.

7. A substrate according to claim 1, wherein each of the first and second electrodes has side surfaces inclined at 30° to 90° with respect to a surface of the insulating substrate.

8. A substrate according to claim 1, wherein the third electrodes are formed by processing the same conductive layer as that forming the opposite signal lines and the scanning signal lines.

9. A substrate according to claim 1, wherein each of the pixel regions has an opening formed in the insulating film between the scanning signal line and one of the opposite signal lines adjacent to the scanning signal line, the opening reaching the surface of the substrate.

* * * * *